Figure 2:
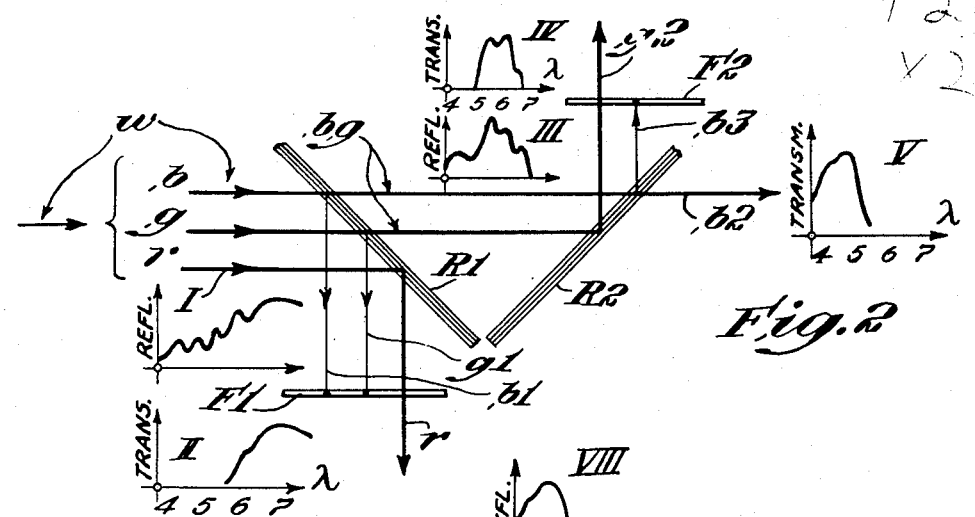

Dec. 23, 1958 — D. H. KELLY — 2,865,245
LIGHT DIVIDING SYSTEM
Filed Dec. 8, 1953

Inventor
Donald H. Kelly
by Roberts, Cushman & Grover
att'ys

United States Patent Office 2,865,245
Patented Dec. 23, 1958

2,865,245

LIGHT DIVIDING SYSTEM

Donald H. Kelly, Los Angeles, Calif., assignor to Technicolor Corporation, Hollywood, Calif., a corporation of Maine Application December 8, 1953, Serial No. 396,818

3 Claims. (Cl. 88—1)

This invention relates to a system for dividing a light beam comprising several spectral ranges into component beams of different spectral ranges which can be advantageously used for projection, upon individual optical modulation.

Color selective light dividers are used for the synthesis of images impressed on component beams by optical modulation or for analysis of an image carrying beam into image carrying component beams. An example for beam synthesis is the additive image projection of color separation records, and an example for beam analysis is the recording on film of color aspect images. Devices for these respective purposes present quite different problems.

For color analysis such as in photographic or television cameras, the light dividing device must be highly efficient as regards the transmission of light of each spectral region to its optically recording or electrically transmitting aperture (such as that of the film of a camera or the photoelectric element of an iconoscope) but there is no need to produce very well saturated color bands. It is not necessary to exclude by means of the light divider small amounts of light of a wave length which is undesired at a given aperture, because the response of the recording or transmitting means at the aperture can be controlled as to spectral response in ways which are independent of the operation of the light divider proper. For example, the sensitization of film for color cameras usually effects a sharp cut-off at the long wave length side while the short wave length cut-off can be made equally sharp by way of efficient dye absorption filters which do not materially affect the peak sensitivity of the respective film or the over-all speed of the recording or transmitting process. It is thus possible to design such systems with regard to highly efficient light transmission and reflection rather than to clean separation of the spectral regions. In other words, low loss at the beamsplitter is here more important than purity of the component beams emerging therefrom.

For color synthesis however the component beams must be as pure as possible. In an additive projector for example, the white light from the lamp house is divided into three beams each of an individual spectral range or wave lengths band. These component beams are then modulated by impressing thereon respective images which are then reassembled. If the white light is divided by color selective means such as color discriminatory interference coatings, the color rendition at the receiving component such as a projection screen will depend solely upon the purity or saturation of the component beams produced by the beamsplitter, no matter how perfect the modulation of the individual component beams may be. Correct transmission by the modulating element is meaningless if wave lengths that should be transmitted are not present in the respective component beam, or if the wave lengths distribution within the component band is non-uniform or different from that for which the modulating element is designed. The entire white light from the lamp reaches the screen or transfer element by one path or another, apart from that absorbed in modulation or by filters. Thus, although unnecessary filter absorption should be avoided, the beamsplitter efficiency is here of secondary importance, since it does not affect the screen brightness or the energy received at a transmitting element, and the quality of the system as a whole depends largely on the wave length characteristics of the component beams which form the primaries of the system so that control of the saturation of the component beams is extremely important.

The color discriminatory division of a beam containing essentially the entire spectrum (whether image modulated as in the case of color analysis, or unmodulated as in the case of color synthesis) is now accomplished in certain apparatus by means of optical interference coatings. These comprise alternating transparent layers of high and low index materials on a glass surface which is placed in the incident beam at a convenient angle, usually 45°. The reflection of such optical interference coatings can be increased to almost 100% of the incident light at any desired wave lengths, whereas the transmitted light never contains all the light of the remaining wave lengths. We have thus the situation that the transmitted beam does not contain any energy at most of the wave lengths of the reflected beam whereas the latter does contain energy at most of the wave lengths of the former although this is not desired or intended. For example, a red reflecting interference coating can be made to reflect almost 100% of the incident red light, but the reflected beam also contains a good deal of green and some blue light, whereas the transmitted beam is essentially free of red light, although it does of course contain all but the reflected fraction of blue and green light. In other words the transmission is essentially perfect as to saturation although not 100% efficient, whereas the reflection, although 100% efficient in the desired wave length band, is desaturated with wave lengths which should be transmitted. The phenomenon that an interference coating designed to reflect nearly all of the light in one color band will also reflect small but undesirable amounts of light at other wave lengths is inherent in the nature of such coatings and while it can be reduced to a minimum by appropriate choice of materials and layer thickness, it cannot be completely eliminated. As mentioned above, the slight inefficiency of the transmitted beam is of little consequence for synthetic projection, whereas side band desaturation of the reflected beam is detrimental for that purpose, although it would be of little consequence for color analysis of an image carrying white beam.

Although, theoretically, desaturated beams can be purified by removing the undesired side bands (such as the blue and green side bands of a reflected beam) with filters, the practical possibilities of such correction depends upon the character of available dye absorption of interference type filters and these represent certain difficulties within synthesis systems, as will be discussed more in detail herein below.

Synthesis systems are used, in addition to the above mentioned additive image projection, for the modulation of television sending or receiving devices. Analogous systems which do not have the purpose of additive projection in the strict meaning of that term, can be used for the printing of color records by way of a composite unmodulated beam with three component beams whose saturation is as perfect as possible but whose intensity can be individually controlled for timing purposes. Since it is obviously desirable to utilize the inherent efficiency of optical interference light dividers, it has been proposed to use such interference coatings for these purposes, for example a red reflector combined with a blue reflector and with corrective dye absorption filters. In such a system, the peak output of the green transmitted beam is seriously reduced by the side bands of the red and blue reflectors, and whereas the red beam can be cleaned up by means of an efficient red dye or glass filter, the blue beam cannot be so cleaned up without essentially reducing its efficiency to a level even below that of the green beam.

It is one of the main objects of the present invention to provide a system of dividing an essentially white light beam into component beams of maximum saturation so that each represents a distinct spectral band with sharp cut-offs towards the adjacent band of another component beam, while preserving high efficiency of the system as a whole. Another object is to provide such a system which is of minimum optical length.

According to the invention, light dividing apparatus for purposes of additive light synthesis has means for projecting a beam of essentially white light combined with two dichroic reflectors of the optical interference type disposed in the white beam in a position inclined to the axis of the beam, at least one reflector having an interference coating for reflecting essentially all light of the red spectral range while predominantly transmitting and partly reflecting the blue and green components of the remaining spectral range, and the other reflector having an interference coating which transmits one and reflects the other of the transmitted components, and further combined with a filter which absorbs the remaining spectral range in the light which is reflected by the first reflector, whereby the transmitted blue and green components are essentially saturated without admixture from the red range, and the remaining reflected spectral range can be removed from the saturated red beam by means of the filter.

In another aspect of the invention, the two coatings are arranged L-fashion one behind the other, both having a comparatively great number of layers which can be of essentially similar optical thickness, the first coating reflecting essentially all red and some blue and green light, and the second coating reflecting essentially all green and some blue light while transmitting predominantly blue light; the blue and green light reflected by the first coating is absorbed by a red filter and the blue light reflected by the second coating is absorbed by a yellow filter.

Figure 3:
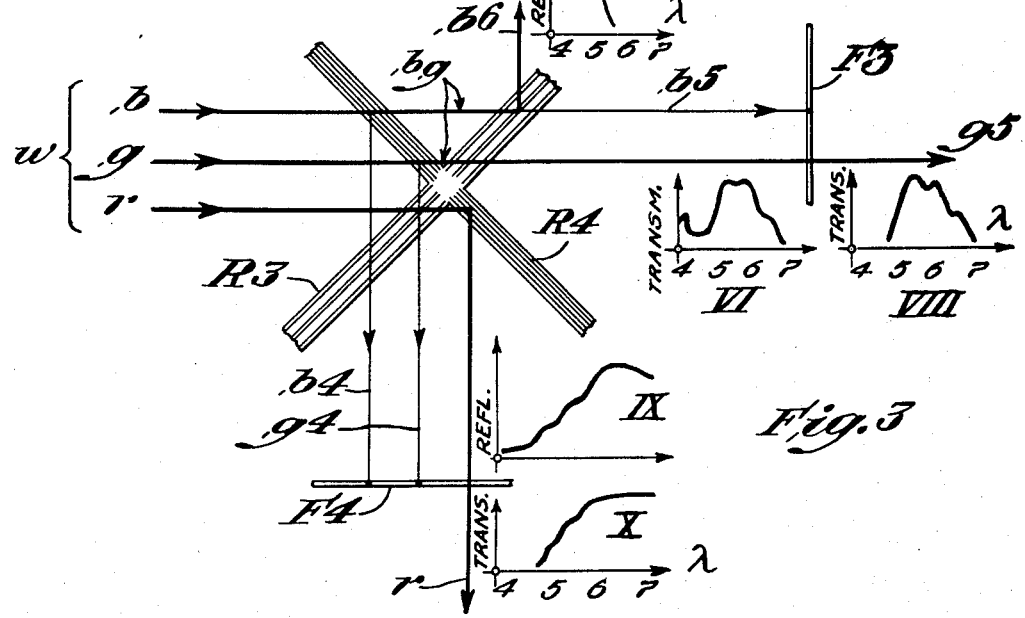
Figures 1, 1A, 1B:
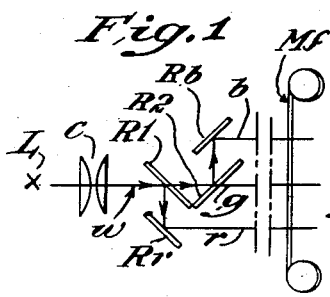

These and other objects and aspects of the invention will appear, in addition to those contained in the above summary of its nature and substance, from the herein presented outline of its principles, its mode of operation and its practical possibilities together with a description of two typical embodiments illustrating its novel characteristics. These refer to drawings in which Figs. 1, 1a and 1b are diagrams illustrating color synthesis devices for which the invention is particularly useful; and Figs. 2 and 3 are schematic cross sections through two embodiments of the light dividing system according to the invention, one with two interference coatings intersecting outside the beam and the other with the coatings intersecting within the beam.

The invention is mainly based on the possibility of reducing the side band effect on an interference type light divider to the point where the saturation of one of the component beams is sufficient for purposes of the technique in question without the need of an auxiliary clean-up absorption filter for that beam, and on the concept of selecting and arranging the component interference coatings so that only highly efficient clean-up filters need be used for improving the saturation of the remaining component beams.

For a better understanding of the invention and particularly also of its embodiments in practical devices, it is desirable shortly to review certain properties of optical interference coatings, of absorption filters, and of coating juxtaposition, as follows.

As indicated above, the reflection by an optical interference coating of a desired wave length band can be increased to almost 100% of the incident light of that wave length, by increasing the total number of layers of the coating. However, if the high index and low index layers have similar optical thicknesses under the conditions of intended use, relatively large reflection side bands are produced which desaturate the reflected beam and decrease the intensity of the transmitted beam. These reflected side bands can be reduced by departing from the usual structure of coatings with equal optical thickness of the layers, thus considerably improving the saturation of the reflected beam. However, such a system (for example composed of three-quarter wave length high index layers and considerably thinner low index layers) in turn decreases the saturation of the transmitted beam by slightly reducing the peak of the reflected beam. In other words, an increase in reflection by increasing the number of layers causes desaturation of the reflected beam, whereas improvement of the saturation of the reflected beam, by adoption of unequal layer thickness, desaturates the transmitted beam.

It is thus evident that, at the present state of our knowledge of the use of material available for the making of optical interference layers of reasonably simple construction, for example with less than twenty layers, saturated colors can be produced in either the reflected beam or the transmitted beam of a given coating but not in both reflected and transmitted beam, due to the inherent defects of either increasing the number of coating layers or of selecting unequal layer thickness.

Considering now the available corrective absorption filters, it must be kept in mind that the blue transmitting filters and the cyan transmitting (red absorbing) filters (the so called blue-cyan series) are much less efficient than the red transmitting and yellow transmitting (blue absorbing) filters (the red-yellow series), and cause prohibitive loss of light even at the peak of their transmission bands. Thus a coating reflecting practically all blue light but also some desaturating green and red light, cannot be efficiently corrected with a red and green absorbing (blue) dye filter which is so inefficient in its blue transmission band that the 100% blue reflection of the interference coating is reduced to as little as 50% of the incident energy at the peak wave length. Blue transmitting interference filters could be used instead of dye or glass absorption filters but, although interference filters are somewhat more efficient than the corresponding absorption filters, they do not approach the efficiency of the red-yellow dye filter series, due to their own side bands.

Considering finally differences of juxtaposition arrangement of mutually inclined surfaces within a beam, it will be evident that two such positions are possible, namely one with the surfaces intersecting outside of, and one with the surfaces intersecting within the beam; the first possibility is often referred to as L-type, and the other as X-type. The optical difference between L-type and X-type is as follows. In both systems, the transmitted beam goes through both coatings. In a system of the X-type, each beam which is reflected at one coating must be transmitted by the other coating, whereas this is true of only one of the reflected beams in an L-type arrangement. Defects of the second coating therefore can have no effect upon the first reflected beam of an L-type device even though they occur at the wave lengths of its main reflection band. On the other hand, L-type light dividers involve an increase in mechanical clearance needed along the optical path, as will be evident from a comparison of Figs. 2 and 3.

Fig. 1 indicates by way of example a synthesis system to which the present invention is advantageously applied. In this figure, L is a source emitting white light which is collimated at C and then reaches a light dividing system for example of the L-type, with suitable supports for the optical interference coatings R1 and R2. The light beam w is there divided into three component beams b, g and r. Beams b and r are deflected by conventional reflectors Rb and Rr into desirable directions for further use involving the impression upon the individual beams of a pictorial or other image, for example by way of a film Mf comprising sets of photographic negatives for additive projection on a screen. As a possible alternative, Fig. 1a shows a set of scotophor type cathode ray tubes indicated at Mt, for impressing on the component beams b, g, r images such as pictures transmitted to these tubes by way of television apparatus. The use for flying spot scanning of film is indicated in Fig. 16 by phototubes T which can be used, together with the optical modulator Mf of Fig. 1, or, after coaxial superposition together with a single color film as modulator, for photoelectrically modulating a television sending circuit, in which case the light source L is constituted by the flying spot of a scanning kinescope. The above mentioned possibility of using the invention for purposes of the photographic printing of multilayer color records (such as the contact printing of tri-color positives from complementary color negatives) is also illustrated by Fig. 1. For this purpose the three beams b, g, r, instead of being separately modulated by Mf, are coaxially combined at a single aperture containing the modulating film, so that each color beam can be separately regulated.

It will be noted that the difference between a synthesis system of this type and systems of the analysis type is the replacement of a source of uniform white light with an image transmitting object and the replacement of image impressing means such as the modulator Mf with recording elements such as motion picture negative film.

In accordance with the principles of the invention, light dividers of the synthesis type with optimum saturation and efficiency characteristics can be obtained with either X-type or L-type coatings. Two embodiments, one for an X-type device and one for an L-type device will now be described with reference to Figs. 2 and 3, respectively.

In the embodiment according to Fig. 2, only the transmitted beams are saturated so that the number of layers of each coating is increased so far as necessary for that purpose. This embodiment is an example for a three component light dividing system of the L-type according to Fig. 1, for which this type of coating is especially suitable.

In Fig. 2, w is the collimated beam of white light similarly indicated in Fig. 1. Its blue, green and red spectral components are indicated, for purposes of explanation, by component beams b, g, and r. The beam w first encounters an optical interference coating R1 which consists of several layers of suitable dielectric materials. The complete optical data of this coating are tabulated below. All the light transmitted by R1 then encounters the second optical interference coating R2 whose optical data are likewise tabulated below.

The first coating R1 is a red reflector which inherently reflects substantially all light above the wavelength of approximately 600 millimicrons and thus excludes enough red from the transmitted light to produce a saturated cyan beam bg as is evident from the wave length versus reflection diagram I of Fig. 2. Any blue or green side bands appearing in the reflected beam r are eliminated by an efficient auxiliary red transmitting filter of the dye absorption type, which is indicated at F1. This filter has an absorption-transmission characteristic which is steep within a wave length range between approximately 550 and 650 millimicrons, to produce a reflected beam of substantially saturated red light. This is evident from the difference between the diagram I and the wave length versus transmission diagram II, respectively, of Fig. 2, which difference represents the light absorption due to the filter F1. The diagram I indicates the spectral char-acteristic of the light reflected at R1 and it will be noted that the red range is completely reflected, but desaturated by some green and blue light b1, g1. Diagram II indicates the spectral characteristics of the beam r after having passed filter F1 which eliminates the blue and green ranges b1, g1 so that the final beam r contains practically 100% of the red light in original beam w.

Coating R2 reflects nearly all of the green light g2 reaching it, inherently reflecting all light above the wavelength of approximately 500 millimicrons and transmitting a saturated blue beam b2 as is evident from the wave-length versus reflection diagram III of Fig. 2. Since red light reaches it due to the reflection of nearly all red light at coating R1, the color of the reflected beam is composed of the green range with an admixture of only some blue light b3. This blue side band can be eliminated by an efficient yellow, blue absorbing filter F2. This filter has an absorption-transmission characteristic which is steep within a wave length range between approximately 450 and 550 millimicron, to produce a reflected beam of substantially saturated green light. This is evident from the difference between the diagram III and the wave length versus transmission diagram IV, respectively, of Fig. 2, which difference represents the light absorption due to the filter F2. Diagram III indicates the spectral range of reflected beam g2 before reaching the blue absorbing filter F2, and diagram IV indicates the range of g2 after having passed this filter.

The transmitted blue beam b2 is well saturated, since both the red and green light have been successively removed by the two preceding mirrors as above described and indicated in diagram V. An auxiliary filter for b2 is unnecessary. Only red and yellow correcting filters have been used, and the only inefficiencies are those of the interference coatings themselves. The short wave length cut-offs of the primary colors are all established by one and the same type of device, namely absorption filters, whereas the long wave length cuts-offs are established by another type of device, namely the interference coatings. The diagrams II, IV and V clearly indicate that the emergent component beams b2, g2 and r are optically saturated and that the loss due to absorption filters is a minimum.

The second embodiment according to Fig. 3 is especially suitable where not enough room is available in the optical system for an L-type arrangement according to Fig. 2, and it depends to some extent on the elimination of side bands by changing the optical thicknesses of the layers of one coating and by so producing in that coating a saturated reflection rather than transmission. This layer is indicated at R3 and its structural characteristics are tabulated below. The second interference coating R4 is of the type of coatings R1 and R2 (Fig. 2) and is likewise tabulated below.

The collimated light beam w with components b, g, r is incident on both coatings. The coating R4 (which can be identical with R1) reflects practically all the red light removing the red range from the transmitted light thus producing a saturated cyan beam as indicated at bg. The blue reflecting component R3 also transmits a few percent of the incident light in the blue part of the spectrum, indicated at b5 so that its transmitted beam g5 is not necessarily a saturated green. However the beam reflected by R3, namely the blue beam b6 has a minimum green side band. It will be remembered that it cannot contain red side bands because these are eliminated at R4. Thus the reflected blue beam b6 can be made highly saturated without the use of any auxiliary correcting filter which would have to be of an inefficient type. The blue side band b5 transmitted by R3 can be removed by an efficient yellow filter F3. Diagram VI indicates the spectral characteristics of beam b5, g5 before it reaches filter F3, and diagram VII shows the band of the finally emerging beam g5. Diagram VIII characterizes beam b6.

As described with reference to Fig. 2, the side bands $b4$, $g4$ of red beam $r$ can be eliminated by a filter F4 which is similar to filter F1 of Fig. 2. In Fig. 3, diagram IX indicates the spectral characteristics of reflected beam $b4$, $g4$, $r$ prior to reaching filter F4 whereas diagram X indicates the effect of this filter. It will be noted that diagrams I and II of Fig. 2 and diagrams IX and X of Fig. 3 are not fully identical which is due to the slightly different characteristics of the respective systems.

Again only the red and yellow auxiliary filters are used. The side bands of the red reflector R4 decrease the over-all efficiency of the system slightly, but they do not interfere with its saturation and the compactness of the X-type geometry has been preserved in this embodiment according to Fig. 3.

The structure of the interference coatings is as follows:

| Coating | Low Index Layers | | | | | High Index Layers | | | |
|---|---|---|---|---|---|---|---|---|---|
| | No. | Material | $n$ | $\lambda$ | $nt^*$ | No. | Material | $n$ | $\lambda$ | $nt^*$ |
| R1, R4 | 4 | Cryolite | 1.27 | 540 | $\lambda/4$ | 5 | Zinc Sulfide | 2.3 | 500 | $\lambda/2$ |
| R2 | 6 | ...do | 1.27 | 440 | $\lambda/4$ | 7 | ...do | 2.3 | 460 | $\lambda/2$ |
| R3 | 4 | ...do | 1.27 | 440 | $\lambda/2$ | 5 | ...do | 2.3 | 440 | $3\lambda/4$ |

* Measured at normal incidence.

The filters F1, F4 and F2, F3 are of the above discussed red-yellow series, and should have steep absorption-transmission characteristics in the ranges from 550 to 650 millimicron and 450 to 550 millimicron, respectively, as indicated for filters F1 and F4 by the difference between the curves I and II respectively of Fig. 2 and IX and X respectively of Fig. 3, and as indicated for filters F2 and F3 by the difference between the curves III and IV, respectively of Fig. 2 and VI and VII respectively of Fig. 3.

The following filters are satisfactory for this purpose:

F1, F4 _____ Wratten No. 24, or Corning No. 2424.
F2, F3 _____ Wratten No. 8, or Corning No. 3384.

It should be understood that the present disclosure is for the purpose of illustration only and that this invention includes all modifications and equivalents which fall within the scope of the appended claims.

I claim:

1. Light dividing apparatus comprising: means for projecting a beam of essentially white light along a given axis; a first and a second substantially transparent supporting means arranged in said axis one behind the other and inclined to each other and to said axis; on said first surface a first optically selective light transmitting and reflecting interference coating having a plurality of alternate layers of media of respectively high and low refractive indexes of respective approximately equal optical thicknesses, for selectively transmitting light in the blue and green spectral bands and for reflecting light in the red spectral band, the said refractive indexes and number and thicknesses of said layers being such that inherently substantially all light above the wave length of approximately 600 millimicron is reflected while appreciable portions of blue and green light are also inherently reflected such that the beam that is reflected by said coating contains substantially all incident red light but also blue and green light and that the beam that is transmitted by said coating contains the remainder of the incident blue and green light and is substantially free of red light; on said second surface which receives said remainder of the incident blue and green light a second optically selective light transmitting and reflecting interference coating having a plurality of alternate layers of media of respectively high and low refractive indexes of respective approximately equal optical thicknesses, for selectively transmitting light in the blue spectral band and for reflecting light in the green spectral band, the said refractive indexes and number and thicknesses of said layers of said second interference coating being such that inherently substantially all light above the wave length of approximately 500 millimicron is reflected while an appreciable portion of blue light is also inherently reflected such that the beam that is reflected by said second coating contains substantially all green light incident from said first coating but also blue light and that the beam that is transmitted by said second coating contains substantially only the remaining blue light; in the reflected beam of said first interference coating a first absorption filter positioned opposite said first surface such as to intercept the light reflected therefrom which first absorption filter transmits substantially all red light and has an absorption-transmission characteristic which is steep within a wave length range between approximately 550 and 650 millimicron and such as to absorb substantially all blue and green light thereby to produce a reflected beam of substantially saturated red light; and in the reflected beam of said second interference coating a second absorption filter positioned opposite said second surface such as to intercept the light reflected therefrom which second absorption filter transmits substantially all green light and has an absorption-transmission characteristic which is steep within a wave length range between approximately 450 and 550 millimicron and such as to absorb substantially all blue light thereby to produce a reflected beam of substantially saturated green light and to produce a transmitted beam of substantially saturated blue light; whereby the red beam that is reflected from said first interference coating and the green and blue beams that are reflected and transmitted, respectively, by said second interference layer, have high color saturation.

2. Apparatus according to claim 1 wherein each of the said first and said second optically selective light transmitting and reflecting interference coatings has at least nine of said alternate layers of media of respectively high and low refractive indexes.

3. Apparatus according to claim 1 wherein said first and second absorption filters are of the blue absorbing red-yellow transmitting type having high transmission at the peaks of their transmission bands.

References Cited in the file of this patent
UNITED STATES PATENTS

| | | |
|---|---|---|
| 1,238,775 | Ives | Sept. 4, 1917 |
| 2,379,790 | Dimmick | July 3, 1945 |
| 2,412,496 | Dimmick | Dec. 10, 1946 |
| 2,418,627 | Dimmick | Apr. 8, 1947 |
| 2,560,351 | Kell et al. | July 10, 1951 |
| 2,594,382 | Bedford | Apr. 29, 1952 |
| 2,604,813 | Gretener | July 29, 1952 |
| 2,642,487 | Schroeder | June 16, 1953 |
| 2,672,072 | Sachtleben et al. | Mar. 16, 1954 |

OTHER REFERENCES

Widdop article in Journal Society of Motion Picture and T. V. Engineers, vol. 60, #4, April 1953, pages 357, 362–365.